(12) United States Patent
Dong et al.

(10) Patent No.: US 9,703,141 B2
(45) Date of Patent: Jul. 11, 2017

(54) LIQUID CRYSTAL DISPLAY PANEL, DISPLAY DEVICE, AND MANUFACTURING METHOD OF LIQUID CRYSTAL DISPLAY PANEL

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Ruijun Dong, Beijing (CN); Haiwei Sun, Beijing (CN); Xue Dong, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 363 days.

(21) Appl. No.: 14/347,021

(22) PCT Filed: Jun. 6, 2013

(86) PCT No.: PCT/CN2013/076886
§ 371 (c)(1),
(2) Date: Mar. 25, 2014

(87) PCT Pub. No.: WO2014/166152
PCT Pub. Date: Oct. 16, 2014

(65) Prior Publication Data
US 2015/0219965 A1    Aug. 6, 2015

(30) Foreign Application Priority Data
Apr. 9, 2013    (CN) .......................... 2013 1 0121470

(51) Int. Cl.
G02F 1/1335    (2006.01)

(52) U.S. Cl.
CPC .. *G02F 1/133609* (2013.01); *G02F 1/133512* (2013.01); *G02F 1/133514* (2013.01);
(Continued)

(58) Field of Classification Search
CPC ......... G02F 1/133617; G02F 1/133512; G02F 1/133609; G02F 1/133516; G02F 1/133603; G02F 1/133514; G02F 2202/36
(Continued)

(56) References Cited

U.S. PATENT DOCUMENTS 6,599,668 B2 * 7/2003 Chari ....................... G03C 7/08
                                                                    430/511
8,865,477 B2 * 10/2014 Shih ........................ B82Y 5/00
                                                                   252/301.4 R
(Continued)

FOREIGN PATENT DOCUMENTS

| CN | 1523436 A | 8/2004 |
| CN | 102722056 A | 10/2012 |

(Continued)

OTHER PUBLICATIONS

First Office Action issued by the Chinese Patent Office for Chinese Patent Application No. 201310121470.9 dated Jan. 26, 2015, ten (10) pages.
(Continued)

Primary Examiner — Hoan C Nguyen
(74) Attorney, Agent, or Firm — Ladas & Parry LLP

(57) ABSTRACT

A liquid crystal display panel, a display device and a manufacturing method of a liquid crystal display panel. The liquid crystal display panel comprises: a color filter (2) located on an array substrate (1), and the color filter (2) comprises a black matrix (21) and a color filter layer (22) having different color sections, wherein the different color sections of the color filter layer (22) have quantum dots (Continued)

(QDs) of different sizes respectively, and the QDs of different sizes can be excited to generate light of corresponding colors; a protective layer (3) located on the color filter; a liquid crystal layer (4) provided on the protective layer (3); a transparent protective plate (5) provided on the liquid crystal layer (4).

10 Claims, 1 Drawing Sheet

(52) U.S. Cl.
CPC .. *G02F 1/133516* (2013.01); *G02F 1/133603* (2013.01); *G02F 1/133617* (2013.01); *G02F 2202/36* (2013.01)

(58) Field of Classification Search
USPC ........................................................ 349/106
See application file for complete search history.

(56) References Cited

U.S. PATENT DOCUMENTS

| | | | | |
|---|---|---|---|---|
| 8,947,619 B2* | 2/2015 | Li | ..................... | G02F 1/133617 313/467 |
| 2007/0057263 A1* | 3/2007 | Kahen | ..................... | B82Y 10/00 257/79 |
| 2010/0091219 A1* | 4/2010 | Rho | ..................... | G02F 1/133512 349/68 |
| 2011/0156575 A1 | 6/2011 | Yu et al. | | |
| 2013/0242228 A1* | 9/2013 | Park | ..................... | G02F 1/133617 349/61 |
| 2014/0132890 A1 | 5/2014 | Zhang | | |

FOREIGN PATENT DOCUMENTS

| | | | | |
|---|---|---|---|---|
| CN | 102944943 A | | 2/2013 | |
| KR | 2007094679 | * | 9/2007 | ....... G02F 1/133617 |
| TW | 201122653 A | | 7/2011 | |

OTHER PUBLICATIONS

English translation of Third Office Action issued by the Chinese Patent Office for Chinese Patent Application No. 201310121470.9 dated Jan. 26, 2015, nine (9) pages.
English abstract of CH102722056A, one (1) page.
English abstract of CH102944943A, one (1) page.
English abstract of TW201122653A, two (2) pages.
International Search Report for International Application No. PCT/CN2013/076886, 11pgs.
International Preliminary Report on Patentability Appln. No. PCT/CN2013/076886; Dated Oct. 13, 2015.

* cited by examiner

LIQUID CRYSTAL DISPLAY PANEL, DISPLAY DEVICE, AND MANUFACTURING METHOD OF LIQUID CRYSTAL DISPLAY PANEL

CROSS REFERENCE TO RELATED APPLICATIONS

This application is based on International Application No. PCT/CN2013/076886 filed on Jun. 6, 2013, which claims priority to Chinese National Application No. 201310121470.9 filed on Apr. 9, 2013. The entire contents of each and every foregoing application are incorporated herein by reference.

TECHNICAL FIELD

Embodiments of the invention relate to a liquid crystal display panel, a display device, and a manufacturing method of a liquid crystal display panel.

BACKGROUND

Semiconductor quantum dots (QDs), also known as nanocrystals, are clusters of a finite number of nano scale atoms and molecules, the particle sizes of which are generally within a range of 2-20 nm. At present, the QD materials mainly include IV group, III-V group, and II-VI group QD materials. The QD materials from II-VI group are widely used because they can be easily prepared and their excitation spectra almost cover the whole visible-light range.

When the particle size of a nano-material is reduced to a certain value (typically 10 nm) or less, the energy levels of the electrons in the vicinity of a metal Fermi energy level are changed from quasi-continuous energy level into discrete energy levels, and the energy gaps between the discrete highest occupied molecular orbital energy levels and lowest unoccupied molecular orbital energy levels of the semiconductor nano-particles are widened, causing a blue shift of the absorption spectral peaks and fluorescence spectral peaks; such phenomenon is called quantum-size effect.

The quantum-size effect makes the electro-optical properties of semiconductor QDs greatly changed. The quantum-size effect, arising when the particle size of semiconductor QDs is less than the Bohr radius of exciton, changes the energy level structure of a semiconductor material, converting the energy level structure from a continuous energy band structure into a discrete energy level structure exhibiting molecular properties. With this phenomenon, semiconductor QDs having different particle sizes can be prepared in a same reaction, to produce light emission at different frequencies, thereby facilitating modulation of various luminous colors.

As shown in FIG. 1, a conventional liquid crystal display panel comprises: an array substrate 1 and a color filter substrate 6 which are provided opposite to each other, and a liquid crystal layer 4 provided between the array substrate 1 and the color filter substrate 6. The light emitted from the backlight source of the liquid crystal display panel may be white light, and the white light is a mixture of blue light and yellow light and is impure in color. The white light, after filtered in passing through Red, Green, Blue (R\G\B) trichromatic sections of a color filter layer 22 in the color filter substrate 6, gives rise to monochromatic light, which however contains various colors out of expectations, which results in a screen having a lower color gamut with less bright and less vibrant colors; in addition, when the array substrate 1 and the color filter substrate 6 are oppositely positioned, the device suffers from a larger deviation, and thus it's necessary to make the black matrix 21 wider, which however leads to reduction of aperture ratio.

SUMMARY

Embodiments of the invention provides a liquid crystal display panel, a display device, and a manufacturing method of a liquid crystal display panel; by utilizing a QD technology, purer monochromatic light can be generated, thereby achieving a better color-mixing effect, which can improve the color gamut of a screen and thus enhance the display quality.

One aspect of the present invention provides a liquid crystal display panel, comprising: an array substrate; a color filter located on the array substrate, wherein the color filter comprises a black matrix and a color filter layer having different color sections, the different color sections of the color filter layer have quantum dots (QDs) of different sizes respectively, and the QDs of different sizes can be excited to generate light of corresponding colors; a protective layer located on the color filter; a liquid crystal layer provided on the protective layer; and a transparent protective plate provided on the liquid crystal layer.

Another aspect of the present invention provides a display device, comprising a liquid crystal display panel as described above.

Yet another aspect of the present invention provides a manufacturing method of a liquid crystal display panel, and the method comprises: forming a black matrix on a side of the array substrate formed with thin-film transistors; on the array substrate, forming quantum dots (QDs) of different sizes in the black matrix corresponding to different color sections of a color filter layer respectively, and the QDs of different sizes being configured to be excited to generate light of corresponding colors; forming a protective layer on the color filter layer and the black matrix; providing a liquid crystal layer on the protective layer; and providing a transparent protective plate on the liquid crystal layer to form a liquid crystal cell.

BRIEF DESCRIPTION OF THE DRAWINGS

In order to clearly illustrate the technical solutions of the embodiments of the invention, the drawings of the embodiments will be briefly described in the following; it is obvious that the described drawings are only related to some embodiments of the invention and thus are not limitative of the invention.

REFERENCE NUMERALS

Figure 1:
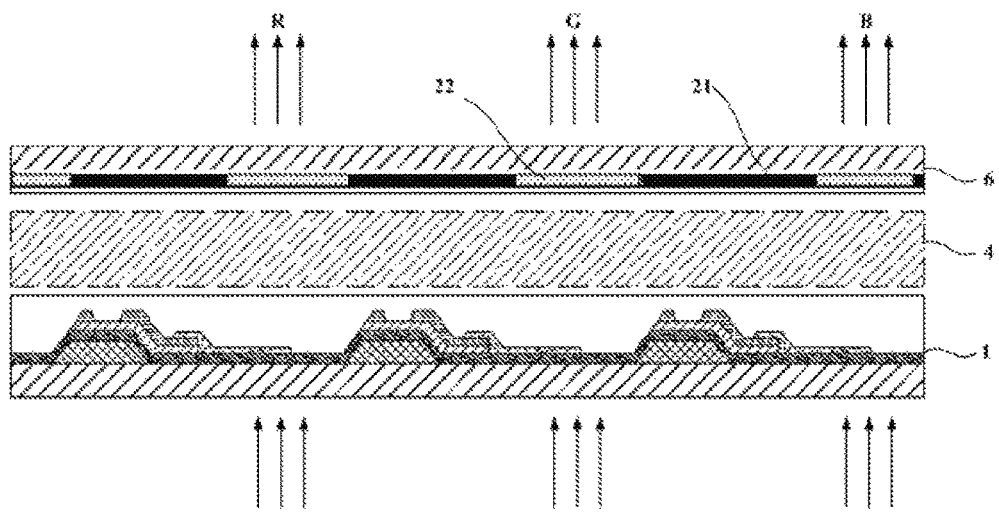
FIG. 1 is a schematic structural diagram of a conventional liquid crystal display panel.

1—Array substrate; 2—Color filter; 3—Protective layer; 4—Liquid crystal layer; 5—Transparent protective plate; 6—Color filter substrate; 11—Passivation layer; 21—Black matrix; 22—Color filter layer.

DETAILED DESCRIPTION

In order to make objects, technical details and advantages of the embodiments of the invention apparent, the technical solutions of the embodiments will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Unless otherwise defined, technical jargon or scientific terms used herein should be interpreted in the usual sense as understood by those ordinary skilled in the relevant art of the present invention. The terms "first", "second", and the like, used in the specification and claims of this patent application of the invention, do not denote any order, quantity, or importance, but are used to distinguish among different integral parts. Likewise, the words "a", "an" and the like, herein do not denote a limitation of quantity, but denote the presence of at least one of the referenced item. The words "comprise" or "include" or the like, are referred to that the elements or objects which appear before "comprise" or "include" encompass the elements or objects and their equivalents which are enumerated after "comprise" or "include", and do not exclude other elements or objects. The terms "connect", "couple" or the like, are not limited to physical or mechanical connections, but may comprise electrical connection, whether direct or indirect. The terms "on", "under", "left", "right" and the like are only used to indicate a relative positional relationship, which may be changed along with a change in an absolute position of a described object.

In order to improve the color gamut of a display image, an embodiment of the invention provide a liquid crystal display panel, a display device, and a manufacturing method of a liquid crystal display panel. The liquid crystal display panel comprises: an array substrate; a color filter located on the array substrate; a protective layer located on the color filter; a liquid crystal layer provided on the protective layer; a transparent protective plate provided on the liquid crystal layer. The color filter comprises a black matrix and a color filter layer having different color sections; the different color sections of the color filter layer have QDs of different sizes respectively, and the QDs of different sizes can be excited to generate light of corresponding colors.

The embodiment mentioned above, by using QDs that can be excited to generate different monochromatic light and due to the fact that QDs have narrow light-emission spectra and high luminous efficiency, can greatly improve the color gamut of the liquid crystal display panel, enhance the color saturation, and improve the display quality of the display panel.

Figure 2:
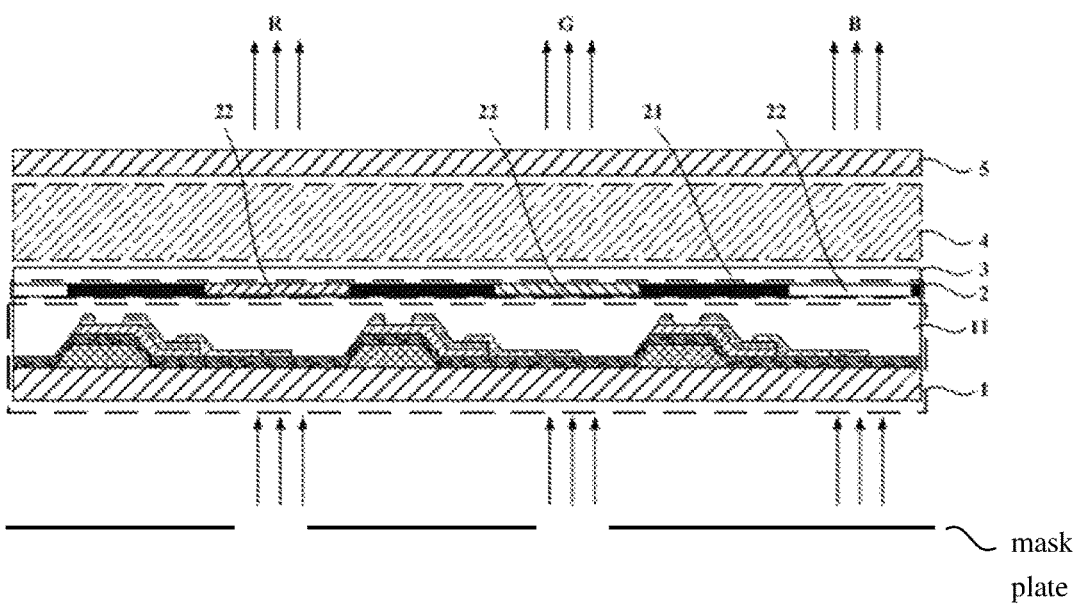
FIG. 2 is a schematic structural diagram of a liquid crystal display panel of an embodiment of the invention.

FIG. 2 is a schematic structural diagram of a liquid crystal display panel of an embodiment of the invention, and as shown in drawing, the liquid crystal display panel comprises: an array substrate 1, a color filter 2 located on the array substrate 1, a protective layer 3 located on the color filter 2, a liquid crystal layer 4 located on the protective layer 3, and a transparent protective plate 5 located on the liquid crystal layer 4. The color filter 2 of the embodiment comprises: a black matrix 21, and a color filter layer 22 having Red-Green-Blue trichromatic sections; a red section and a green section of the color filter layer 22 have red light-emitting QDs and green light-emitting QDs respectively. The transparent protective plate 5 is on the display side of the liquid crystal display panel.

In the embodiment of the invention, the red section of the color filter layer 22 has red light-emitting QDs, and the green section has green light-emitting QDs; because QDs have high luminous efficiency and narrow emission spectra, they can efficiently convert the light from a backlight source into approximately-monochromatic red light R or green light G, thereby expanding the color gamut and improving the display quality of the screen. The QDs have different sizes, and therefore can convert light into different color light; typically, the size of the red light-emitting QDs is about 10 nm, the size of the green light-emitting QDs is about 8 nm, and the size of the blue light-emitting QDs is about 2-3 nm. Because a backlight source that can excite blue light-emitting QDs requires higher optical energy, in an example of the embodiment, for the blue section of the color filter, a conventional blue photoresist may be used to constitute the color filter layer so as to convert the light from the backlight source into blue light. For a color filter layer having Red-Green-Blue-Yellow four primary colors, it is also possible to form red light-emitting QDs and green light-emitting QDs in a red section and a green section respectively. A yellow section may be, for example, obtained by mixing red light-emitting QDs and green light-emitting QDs in a volume ratio of the two, for instance, green:red=5:3 or 5:2.

For a protective layer, a passivation layer may be preferably used, of which the main component is for example $SiN_x$, to stabilize and protect its surface from moisture, contamination and mechanical damages. For a transparent protective plate, a glass plate with high transmittance may be used. In addition, by forming the color filter 2 directly on the array substrate 1 and providing the liquid crystal layer 4 between the array substrate and the protective plate acting as a counter substrate, the deviation in cell-assembling of an array substrate and a color filter substrate in a conventional liquid crystal display panel can be avoided; therefore, the liquid crystal panel of the embodiment of the invention can increase aperture ratio and improve brightness.

Preferably, as shown in FIG. 2, the liquid crystal display panel of the embodiment of the invention may further comprise: a backlight source, which is located on the side of the array substrate 1 facing away from the color filter 2 and for example emits blue light.

In the embodiment of the invention, the backlight source may be further defined, for example, as the backlight source emitting blue light as backlight. Blue light has shorter wavelength and higher energy, and can excite red light-emitting QDs and green light-emitting QDs so as to be converted into red light and green light, respectively; moreover, the blue section of the color filter layer 22 may not necessarily be provided with blue resin, but only needs to transmit the blue light of the backlight source; thus, costs can be reduced.

Preferably, for example, the backlight source is a light-emitting diode emitting blue light.

In the embodiment of the invention, the backlight may preferably be a light-emitting diode emitting blue light; because the blue light emitted from the light-emitting diode is approximately-monochromatic light, and the light-emitting diode can be used to further improve the color gamut, and enhance the display quality.

Preferably, for example, red light-emitting QDs and green light-emitting QDs are core-shell type red light-emitting QDs and core-shell type green light-emitting QDs, respectively.

In the embodiment of the invention, core-shell type QDs are used to convert light from the backlight source; in view of the absorption spectra and emission spectra, the core-shell structure QDs have excellent luminous properties, and can significantly decrease surface defects of nano-particles and thus greatly improve luminous efficiency; therefore, employment of core-shell type red light-emitting QDs and core-shell type green light-emitting QDs is advantageous for improving luminous efficiency.

The materials of the core-shell type red light-emitting QDs and those of the core-shell type green light-emitting QDs may be the same or different, and the combination of the core material and the shell material may be, for example, chosen from one of the following three types: the core material is CdSe (cadmium selenide), and the shell material is ZnS (zinc sulfide); the core material is CdSe, and the shell material is CdS (cadmium sulfide); or, the core material is CdS, and the shell material is ZnS.

Because the red light-emitting QDs and the green light-emitting QDs are different in size, upon excitation by the blue light of the backlight, monochromatic red light can be generated in a red section, and monochromatic green light can be generated in a green section.

In the embodiment of the invention, the QDs having the above-described core/shell materials may have quantum efficiency of up to 80%~90%, so they can convert almost all the light emitted from the backlight source into red light or green light; moreover, they have broad and continuously-distributed excitation spectra, narrow and symmetric emission spectra, color-adjustability, high photochemical stability, long fluorescence-lifetime, as well as other superior fluorescence properties.

Since a conventional liquid crystal display panel achieves color display by mixing Red-Green-Blue trichromatic colors, the embodiment of the invention is explained in an example in which red light-emitting QDs and green light-emitting QDs are employed and a blue light-emitting backlight is used to obtain Red-Green-Blue trichromatic light. It can be understood that, the invention is not limited in these regards, that is, in addition to the Red-Green-Blue trichromatic light, the liquid crystal display panel may include light in other colors, such as yellow, and of course, it is also not limited to three or four colors, and it is easier to achieve a wide color gamut by mixing more colors, which colors can be selected according to actual needs, and of course, the backlight is not limited to blue light, and light with a shorter wavelength than that of blue light can be selected for excitation. If the embodiment of the invention chooses blue light as backlight, then the manufacture of blue light-emitting QDs can be omitted, and thus the manufacturing process can be simplified. For these modifications, the present invention is not limited thereto.

The embodiment further provides a liquid crystal display panel, comprising an array substrate and a counter substrate provided opposite to each other; the color filter substrate comprises a black matrix and a color filter layer having Red-Green-Blue trichromatic sections; the red section and the green section of the color filter layer use red light-emitting QDs and green light-emitting QDs, respectively.

An embodiment of the invention further provides a display device, comprising a liquid crystal display panel as any one described above; the display device may be electronic paper, liquid crystal TV, liquid crystal monitor, digital photo frame, mobile phone, tablet computer, and any other product or component with a display function. Since a red section and a green section of the color filter layer in the liquid crystal display panel have red light-emitting QDs and green light-emitting QDs, respectively, the light from a backlight source can be efficiently converted to approximately-monochromatic red light and green light, respectively, thereby improving the color gamut of the displayed images, and thus enhancing the display quality of the display device.

An embodiment of the invention further provides a manufacturing method of a display panel, and the method comprises steps as follows: forming a black matrix on the side of an array substrate formed with thin-film transistors; on the array substrate, forming QDs of different sizes in the black matrix corresponding to different color sections of a color filter layer, respectively, the QDs of different sizes being capable of being excited to generate light of corresponding colors; forming a protective layer on the color filter layer and the black matrix; providing a liquid crystal layer on the protective layer; providing a transparent protective plate on the liquid crystal layer to form a liquid crystal cell.

For the save of description, the embodiment of the invention is explained in an example in which the liquid crystal display panel comprises red light-emitting QDs and green light-emitting QDs and a blue light-emitting backlight is used to produce Red-Green-Blue trichromatic light. It can be understood that, the invention is not limited in these regards, that is, in addition to the Red-Green-Blue trichromatic light, the liquid crystal display panel may include light in other colors, such as yellow, and of course, it is also not limited to three or four colors, and it is easier to achieve a wide color gamut by mixing more colors, which colors can be selected according to actual needs, and of course, the backlight is not limited to blue light, and the light of a shorter wavelength than that of blue light can be selected for excitation; the embodiment of the invention chooses blue light as backlight, thus the manufacture of blue light-emitting QDs can be omitted, and further the manufacturing process can be simplified. For these modifications of structures, respective manufacturing processes should be adjusted accordingly, that is, QDs of different sizes need to be manufactured corresponding to the different colors; all the adjustment of structures and of manufacturing processes should be within the scope of the invention.

The different color sections of the color filter layer may be provided in the same layer as the black matrix or may be provided in a different layer from the black matrix, for example, the different color sections of the color filter layer may partially overlap with the black matrix at the edge portions. The black matrix may be located below or above the different color sections, and accordingly, during manufacture, the black matrix is firstly formed and then the color filter layer is formed, or the color filter layer is firstly formed and then the black matrix is formed.

An example of the manufacturing method of a liquid crystal display panel according to the embodiment of the invention, comprises steps 101~105 as follows:

Step 101, a black matrix is formed on the side of an array substrate formed with thin-film transistors;

Step 102, on the array substrate, red light-emitting QDs and green light-emitting QDs are formed in the same layer as the black matrix, corresponding to the positions of a red section and a green section of a color filter layer, respectively;

Step 103, a protective layer is formed and located on the color filter layer and the black matrix;

Step 104, a liquid crystal layer is formed and located on the protective layer;

Step 105, a transparent protective plate is covered on the liquid crystal layer to form a liquid crystal cell.

Typically, on the array substrate, there are formed with structures, such as a plurality of thin-film transistors and pixel electrodes, to control a plurality of pixels, and after formation of the structures such as the thin-film transistors and pixel electrodes, usually a passivation layer is further formed; thus, the manufacture of the array substrate is completed. In order to achieve the structure of integrating a color filter on the array substrate, a black matrix and a color filter layer are formed on the passivation layer; the color filter layer comprises different color sections each for a pixel, such as red section, green section and blue section, while the black matrix is located at the perimeter of each pixel (thus, the different color sections are located in the black matrix), separating the pixel regions corresponding to respective colors from each other. After completion of the manufacture of the black matrix and the color filter layer, a protective layer is then formed, and then a liquid crystal layer is provided on the protective layer, and finally a transparent protective plate is covered above the liquid crystal layer to form a liquid crystal cell. In the embodiment of the invention, the red light-emitting QDs and the green light-emitting QDs, which are formed in a red section and a green section of the color filter layer respectively, are used to convert the light from the backlight source into red light and green light respectively; because the QDs have the advantage of narrow emission spectra and high luminous efficiency, they can efficiently convert the light of the backlight source into approximately-monochromatic red light or green light, and they can improve the color gamut of the liquid crystal display panel and enhance the display quality of the screen. In addition, by forming the black matrix and the color filter layer directly on the array substrate, and then providing the liquid crystal layer on the array substrate, the deviation in cell-assembling of an array substrate and a color filter substrate in a conventional liquid crystal display panel can be avoided, thereby increasing the aperture ratio of the liquid crystal display panel and enhancing the brightness of the liquid crystal display panel. In the manufacturing method of a liquid crystal display panel according to the embodiment of the invention, the black matrix may be formed by printing; the red light-emitting QDs and the green light-emitting QDs in the color filter layer may be manufactured by using a traditional or a future-developed method; the material of the protective layer is for example SiNx, and the transparent protective plate may use a common glass substrate.

An example, in which red light-emitting QDs and green light-emitting QDs are respectively formed in a red section and a green section of a color filter layer which is provided on the passivation layer of the array substrate, is given as follows. With a masking process, red light-emitting QDs are formed at the positions corresponding to red sections of the color filter layer on the passivation layer, and then green light-emitting QDs are formed in green sections; alternatively, with a masking process, green light-emitting QDs are formed at the positions corresponding to green sections of the color filter layer on the passivation layer and then red light-emitting QDs are formed in red sections.

An example of the step of forming the red light-emitting QDs and the green light-emitting QDs comprises: a mask plate is provided over the array substrate with the opening portions of the mask plate corresponding to the positions of red sections or the positions of green sections on the array substrate; corresponding to the opening portions of the mask plate, a GaAs (gallium arsenide) base layer is formed and located on the passivation layer; a plurality of buried islands are formed and located on the GaAs base layer; a GaAs intermediate layer is formed, covering the plurality of buried islands; on the buried islands, a plurality of QD cores are formed and located on the GaAs intermediate layer; and a QD shell layer is formed, covering the plurality of QD cores.

It should be noted that, the forming processes of the red light-emitting QDs and of the green light-emitting QDs are identical, except for the formation sequence, that is, it is possible to form the red light-emitting QDs firstly and then form the green light-emitting QDs, and it is also possible to form the green light-emitting QDs firstly and then form the red light-emitting QDs, and here the formation sequence is not limited. During the formation process of the red light-emitting QDs, the opening portions of the mask plate correspond to red sections of the color filter layer, while the green sections and the blue sections of the color filter layer are blocked by the mask plate, and therefore, the red light-emitting QDs are formed only in the red sections; likewise, during the formation process of the green light-emitting QDs, the opening portions of the mask plate correspond to green sections of the color filter layer, while the red sections and the blue sections of the color filter layer are blocked by the mask plate, and therefore, the green light-emitting QDs are formed only in the green sections.

In the embodiment of the invention, the red light-emitting QDs and the green light-emitting QDs are formed by a method of designing surface atomic structure, i.e., a method which forms buried islands firstly and then forms an intermediate layer and thereafter generates QDs, so as to control the growth sites of the red light-emitting QDs and the green light-emitting QDs. A surface active inducing layer, i.e., the buried islands, is added to respective sections where the QDs of a certain size are desired to grow, so that the QDs of different sizes are self-grown at predetermined sites. In the embodiment of the invention, by a method of providing a surface active inducing layer, problems such as uncontrollable growth sizes and uneven distribution of the growth sites of QDs can be solved, and the problem of aggregation of QDs also can be solved. The sizes of the buried islands in a red section and a green section respectively correspond to the sizes of the red light-emitting QDs and the green light-emitting QDs; it may preferably use Molecular Beam Epitaxy (MBE) to generate the buried islands, the QD cores and the QD shell layers. Formation of the buried islands can be realized due to the fact that during GaAs growth other elements are added, which causes GaAs during growth and GaAs base layer to have a certain degree of lattice mismatch therebetween; a certain degree of lattice mismatch can suppress two-dimensional layer-mode growth and form three-dimensional island-mode growth.

Preferably, an example of forming a plurality of buried islands located on the GaAs base layer is as follows: on the GaAs base layer, Te (Tellurium) or Si (Silicon) is doped for epitaxial growth to form a plurality of buried islands.

In the embodiment of the invention, the growth of GaAs buried islands on the GaAs base layer may be implemented as follows: Te or Si element is added, causing GaAs to have lattice mismatch, thereby forming islands.

For example, as for the plurality of QDs, the core material is CdSe, and the QD shell-layer material is ZnS; as for the plurality of QDs, the core material is CdSe, and the QD shell-layer material is CdS; or, as for the plurality of QDs, the core material is CdS, and the QD shell-layer material is ZnS. The core/shell materials of the red light-emitting QDs and the green light-emitting QDs may be the same, and also may be different from each other, with the difference in the sizes.

Hereinafter, a specific embodiment is given to explain the manufacturing method of a liquid crystal display panel as shown in FIG. 2 of the present invention. In the example, the QDs having a core layer of CdSe and a shell layer of ZnS are formed; green light-emitting QDs are manufactured firstly, and then red light-emitting QDs are manufactured; a blue-light backlight source is employed, and thus there is no need to manufacture blue resin; the present invention is not limited to the embodiment below. The liquid crystal display panel of the embodiment of the invention has main manufacturing process as follows.

An array substrate is prepared; the array substrate comprises a glass substrate and a plurality of thin-film transistors which are formed on the glass substrate and arranged in an array; the thin film transistor comprises a gate electrode, a gate insulating layer, an active layer, a source electrode and a drain electrode; moreover, the thin film transistors may be of a bottom-gate type, and also may be of a top-gate type; then, a passivation layer is formed to cover the thin-film transistors and the glass substrate, and the material of the passivation layer may preferably be SiNx. The array substrate may be prepared according to existing processes, and the present invention is not limited in this regard.

After completion of the preparation of the array substrate, a black-matrix layer is formed on the passivation layer of the array substrate; here the black-matrix layer is formed by a printing process, and the black-matrix layer is used for preventing light leakage between the respective primary-color sections of the color filter layer.

By applying a masking process, a GaAs base layer is formed on the passivation layer of the array substrate corresponding to the positions of green sections of the color filter layer; here, photoresist is used to cover other positions on the passivation layer of the array substrate except the positions corresponding to the green sections, and then by using a chemical vapor deposition method, a GaAs base layer is deposited.

On the GaAs base layer, a layer of GaAs islands, i.e., buried islands, is formed by self-organized growth so as to obtain growth sites for nano QDs with controllable sizes and densities on the base surface; here, by using an MBE method, during GaAs growth, Te or Si is doped to form about 8 nm-sized buried islands, the MBE temperature is controlled at 360~500 and the growth rate is about 0.2 nm/s; GaAs doped with the element Te or Si will cause GaAs in growth and the GaAs base layer to produce a certain degree of lattice mismatch, while the certain degree of lattice mismatch can suppress two-dimensional layer-mode growth and form three-dimensional island-mode growth After completion of growth of the buried islands, a GaAs intermediate layer with a thickness of about 10~20 nm is grown; specifically, by preferably using a chemical vapor deposition method, a GaAs intermediate layer that is 10~20 nm thick is deposited, and the GaAs intermediate layer may cover the buried islands.

On the GaAs intermediate layer, a QD core layer is grown; here, by using an MBE method, a CdSe QD core layer is grown; due to the existence of the buried islands, stress fields exist on the surface of the GaAs intermediate layer, thus the tops of the buried islands become pre-nucleated sites of a QD layer; the growth rate of the QD cores can be controlled by controlling the MBE temperature, for example, the temperature is generally controlled at 360~500, the growth rate is about 0.2 nm/s, and the size of the grown green light-emitting QD cores is about 5~6 nm.

A QD shell layer is covered on the core layer and the intermediate layer; here, by using an MBE method, an about 1~2 nm-thick ZnS QD shell layer is grown, and the QD size is controlled by the MBE thickness.

After completion of manufacturing the green light-emitting QDs, by applying a masking process, red light-emitting QDs are formed in red sections; the manufacturing method of the red light-emitting QDs in the red sections is the same as that of the green light-emitting QDs, which will not be repeatedly described here, except for the differences in the sizes of the buried islands and the red light-emitting QDs; here, the size of the buried islands of the red light-emitting QDs is about 10 nm, the size of the red light-emitting QD cores is about 8~9 nm, and the size of the red light-emitting QD shell layer is about 1~2 nm.

After completion of manufacturing the red light-emitting QDs and the green light-emitting QDs, the photoresist is removed, and a SiNx protective layer is grown, then a liquid crystal layer is drop-filled on the protective layer, and then a glass protective plate is covered thereon, forming a liquid crystal cell. Thus, a liquid crystal display panel utilizing a QD self-grown layer is completed.

It can be seen that, the formation of the red light-emitting QDs and the green light-emitting QDs adopts a self-organized growth mode, that is, firstly other elements are doped to generate buried islands, and then an intermediate layer is formed, covering the buried islands, and thereafter a QD core layer is formed. Because the buried islands applies stress fields on the surface of the intermediate layer, the QD cores are formed on the buried islands; in this way, the formation sites of the QDs are controlled. Since QDs have high light-conversion efficiency and narrow emission spectra, they can efficiently convert the light of the backlight into proximately-monochromatic red light or green light, thereby improving the color gamut, and enhancing the display quality.

The above are merely exemplary implementations of the present invention, but not for limiting the scope of the invention; instead, the scope of the invention should be defined by the appended claims.

The invention claimed is:
1. A liquid crystal display panel, comprising:
an array substrate;
a color filter located on the array substrate, wherein the color filter comprises a black matrix and a color filter layer having different color sections, the different color sections of the color filter layer have quantum dots (QDs) of different sizes respectively, and the QDs of different sizes can be excited to generate light of corresponding colors;
a protective layer located on the color filter;
a liquid crystal layer provided on the protective layer; and
a transparent protective plate provided on the liquid crystal layer;
a backlight source emitting blue light and located on a side of the array substrate facing away from the color filter;
wherein the color filter layer has red, green, blue and yellow sections, and wherein the red section and the green section of the color filter layer have red light-emitting QDs and green light-emitting QDs, respectively, the yellow section is obtained by mixing red light-emitting QDs and green light-emitting QDs in a volume ratio of green:red=5:3 or 5:2, and the blue section of the color filter layer is transparent.

2. The liquid crystal display panel of claim 1, wherein the backlight source is a light-emitting diode emitting blue light.

3. The liquid crystal display panel of claim 1, wherein the QDs are core-shell type QDs.

4. The liquid crystal display panel of claim 3, wherein as for the core-shell type QDs, a core material is CdSe, and a shell material is ZnS; or,
as for the core-shell type QDs, a core material is CdSe, and a shell material is CdS; or,
as for the core-shell type QDs, a core material is CdS, and a shell material is ZnS.

5. A display device comprising a liquid crystal display panel, the liquid crystal display panel comprising:
an array substrate;
a color filter located on the array substrate, wherein the color filter comprises a black matrix and a color filter layer having different color sections, the different color sections of the color filter layer have quantum dots (QDs) of different sizes respectively, and the ODs of different sizes can be excited to generate light of corresponding colors;
a protective layer located on the color filter;
a liquid crystal layer provided on the protective layer; and
a transparent protective plate provided on the liquid crystal layer;
a backlight source emitting blue light and located on a side of the array substrate facing away from the color filter;
wherein the color filter layer has red, green, blue and yellow sections, and wherein the red section and the green section of the color filter layer have red light-emitting QDs and green light-emitting QDs, respectively, the yellow section is obtained by mixing red light-emitting QDs and green light-emitting QDs in a volume ratio of green:red=5:3 or 5:2, and the blue section of the color filter layer is transparent.

6. A manufacturing method of a liquid crystal display panel comprising an array substrate, the method comprising:
forming a black matrix on a side of the array substrate formed with thin-film transistors; on the array substrate, forming quantum dots (QDs) of different sizes in the black matrix corresponding to different color sections of a color filter layer respectively, and the QDs of different sizes being configured to be excited to generate light of corresponding colors;
forming a protective layer on the color filter layer and the black matrix;
providing a liquid crystal layer on the protective layer;
providing a transparent protective plate on the liquid crystal layer to form a liquid crystal cell; and
providing a backlight source emitting blue light and located on a side of the array substrate facing away from the color filter,
wherein the color filter layer has red, green, blue and yellow sections, and wherein the red section and the green section of the color filter layer have red light-emitting QDs and green light-emitting QDs, respectively, the yellow section is obtained by mixing red light-emitting QDs and green light-emitting QDs in a volume ratio of green:red=5:3 or 5:2, and the blue section of the color filter layer is transparent.

7. The manufacturing method of a liquid crystal display panel of claim 6, wherein on the array substrate, the red light-emitting QDs and the green light-emitting QDs are formed in a same layer as the black matrix while corresponding to positions of a red section and a green section of the color filter layer respectively; the red light-emitting QDs and the green light-emitting QDs are configured to be excited to generate red light and green light, respectively.

8. The manufacturing method of a liquid crystal display panel of claim 7, wherein on the array substrate, by applying a masking process, the red light-emitting QDs are formed In the same layer as the black matrix while corresponding to the position of the red section of the color filter layer, and then the green light-emitting QDs are formed at the position of the green section; or,
on the array substrate, by applying a masking process, the green light-emitting QDs are formed in the same layer as the black matrix while corresponding to the position of the green section of the color filter layer, and then the red light-emitting QDs are formed at the position of the red section.

9. The manufacturing method of a liquid crystal display panel of claim 8, wherein formation of the red light-omitting QDs or the green light-omitting QDs comprises:
providing a mask plate over an array substrate with an opening portion of the mask plate corresponding to a position of a red section or a position of a green section on the array substrate; corresponding to the opening portion of the mask plate, forming a GaAs base layer on a
passivation layer;
forming a plurality of buried islands on the GaAs base layer;
forming a GaAs intermediate layer to cover the plurality of buried islands;
on the buried islands, forming a plurality of QD cores on the GaAs intermediate layer; and forming a QD she layer to cover the plurality of QD cores.

10. The manufacturing method of a liquid crystal display panel of claim 9, wherein forming a plurality of buried islands on the GaAs base layer comprises:
on the GaAs base layer, doping Te or Si for epitaxial growth to form a plurality of buried islands.

* * * * *